United States Patent
Hutchison

(10) Patent No.: US 8,416,687 B1
(45) Date of Patent: *Apr. 9, 2013

(54) ADJUSTING TRANSMISSION RATES DURING PACKET EXPANSION USING IN BAND SIGNALING

(75) Inventor: Guy T. Hutchison, Santa Clara, CA (US)

(73) Assignee: Marvell International Ltd., Hamilton (BM)

( * ) Notice: Subject to any disclaimer, the term of this patent is extended or adjusted under 35 U.S.C. 154(b) by 217 days.

This patent is subject to a terminal disclaimer.

(21) Appl. No.: 12/912,154

(22) Filed: Oct. 26, 2010

Related U.S. Application Data

(63) Continuation of application No. 12/193,519, filed on Aug. 18, 2008, now Pat. No. 7,826,360.

(51) Int. Cl.
*G01R 31/08* (2006.01)
*G06F 11/00* (2006.01)
*G08C 15/00* (2006.01)

(52) U.S. Cl.
USPC .......................... 370/230; 370/230.1; 370/236

(58) Field of Classification Search .................. 370/230
See application file for complete search history.

(56) References Cited

U.S. PATENT DOCUMENTS

| | | | |
|---|---|---|---|
| 5,784,559 A | 7/1998 | Frazier et al. | |
| 6,076,062 A | 6/2000 | Van Steenbrugge | |
| 6,108,713 A * | 8/2000 | Sambamurthy et al. | 709/250 |
| 6,920,132 B1 | 7/2005 | Lo | |
| 6,975,637 B1 | 12/2005 | Lenell | |
| 7,103,124 B1 * | 9/2006 | Lindskog et al. | 375/354 |
| 7,379,422 B2 | 5/2008 | Nation | |
| 7,450,509 B2 | 11/2008 | Hao | |
| 7,519,370 B2 | 4/2009 | Febvre et al. | |
| 7,826,360 B1 | 11/2010 | Hutchison | |
| 7,961,606 B2 * | 6/2011 | Cunningham | 370/229 |
| 2005/0259690 A1 * | 11/2005 | Garudadri et al. | 370/477 |
| 2007/0248118 A1 | 10/2007 | Bishara et al. | |
| 2008/0123555 A1 | 5/2008 | Qi et al. | |
| 2008/0192631 A1 | 8/2008 | Ardhanari et al. | |

* cited by examiner

*Primary Examiner* — Brandon Renner
*Assistant Examiner* — Shaq Taha

(57) ABSTRACT

Various embodiments provide a way to adjust transmission rates of a medium access controller (MAC) to a physical layer (PHY) to accommodate for packet expansions due to encryption that takes place in the PHY. In at least some embodiments, a communication interface between different MACs in a system is re-purposed to allow the PHY to communicate to a system MAC to notify the system MAC to pause and then resume, at an appropriate time, its packet transmissions.

20 Claims, 9 Drawing Sheets

US 8,416,687 B1

ADJUSTING TRANSMISSION RATES DURING PACKET EXPANSION USING IN BAND SIGNALING

RELATED APPLICATION

This application claims priority to U.S. patent application Ser. No. 12/193,519 filed on Aug. 18, 2008 which claims priority to U.S. Provisional Application Nos. 60/968,152, filed on Aug. 27, 2007 and 60/968,470, filed on Aug. 28, 2007, the disclosures of which are incorporated by reference herein.

BACKGROUND

IEEE 802.1AE is the IEEE MAC Security standard, also known as MACsec, and defines connectionless data confidentiality and integrity for media access independent protocols. This standard specifies how encryption is used to secure the links between network devices. MACsec operates by performing link layer encryption for each hop through a network.

This standard integrates security protection into wired Ethernet to secure LANs from attacks such as passive wiretapping, masquerading, man-in-the-middle and denial-of-service attacks. MACsec helps assure ongoing network operations by identifying unauthorized stations on a LAN and preventing communication from them. It protects control protocols that manage bridged network and other data through cryptography techniques that authenticate data origin, protect message integrity, and provide replay protection and confidentiality. By assuring that a frame comes from the station that claimed to send it, MACsec can mitigate attacks on communication protocols.

One of the challenges that this protocol introduces flows from the nature of the encryption protocol that is employed. Specifically, during the transmission process employed by MACsec, packets are enlarged by adding additional bytes to the packets and encrypting the packets. The additional size of the packets requires an increased transmission time to transmit the packet over the wire. Because the speed of the wire is fixed by the standard, there is typically no way to recover this deficit or to provide out of band signals to indicate that transmission rates should be reduced or paused.

SUMMARY

This Summary is provided to introduce subject matter that is further described below in the Detailed Description and Drawings. Accordingly, the Summary should not be considered to describe essential features nor used to limit the scope of the claimed subject matter.

In at least one embodiment, a device comprises a physical layer (PHY) defining a communication path for packets into and out of a system medium access controller (MAC); and wherein the PHY is configured to source a pause frame sent to the system MAC over the communication path to pause packet transmission.

In at least other embodiments, a device comprises a system medium access controller (MAC) having a transmitter for transmitting unencrypted packets to a physical layer (PHY); a PHY configured to receive unencrypted packets from the MAC and encrypt the unencrypted packets, wherein the PHY comprises: a transmitter buffer for buffering unencrypted packets; and a pause frame generator for generating a pause frame to be transmitted to the system MAC, wherein the transmitter buffer is configured to signal the pause frame generator to generate the pause frame.

In yet other embodiments, a method comprises transmitting one or more packets from a system medium access controller (MAC) to a physical layer (PHY); buffering transmitted packets in a transmitter buffer in the PHY; ascertaining whether the transmitter buffer in the PHY is over a first threshold; responsive to the transmitter buffer being over the first threshold, sourcing a first pause frame to be sent to the MAC to pause packet transmission; ascertaining whether the transmitter buffer in the PHY is under a second threshold; and responsive to the transmitter buffer being under the second threshold, sourcing a second pause frame to be sent to the MAC to resume packet transmission.

In further embodiments, a system comprises means for transmitting one or more packets from a system medium access controller (MAC) to a physical layer (PHY); means for buffering transmitted packets in a transmitter buffer in the PHY; means for ascertaining whether the transmitter buffer in the PHY is over a first threshold; responsive to the transmitter buffer being over the first threshold, means for sourcing a first pause frame to be sent to the MAC to pause packet transmission; means for ascertaining whether the transmitter buffer in the PHY is under a second threshold; and responsive to the transmitter buffer being under the second threshold, means for sourcing a second pause frame to be sent to the MAC to resume packet transmission.

BRIEF DESCRIPTION OF THE DRAWINGS

The same numbers are used throughout the drawings to reference like features.

DETAILED DESCRIPTION

Overview

Various embodiments provide a way to adjust transmission rates of a medium access controller (MAC) or a component that performs similar functionality, to a physical layer (PHY) to accommodate for packet expansions due to encryption that takes place in the PHY. In at least some embodiments, a communication interface between different MACs in a system is re-purposed to allow the PHY to communicate to a system MAC to notify the system MAC to pause and then resume, at an appropriate time, its packet transmissions. This solution utilizes in-band notifications so, from a MAC's perspective, it appears as if notifications to pause transmissions come from another MAC at a far end of the link.

The physical layer or PHY of a network device is a lowest layer of a referenced model for standardizing computer-to-computer communications. The medium access controller or MAC forms part of a data-link layer which is the next lowest layer. The PHY establishes and maintains a physical link between communication devices. The MAC manages access to the physical network, delimits frames, and handles error control.

In the discussion that follows, a section entitled "Operating Environment" is provided and describes one example operating environment in which one or more embodiments can be employed. Following this, a section entitled "Example Architecture" describes an example architecture in accordance with one or more embodiments. Next, a section entitled "Example Method" describes an example method in accordance with one or more embodiments. Finally, a section entitled "Example Computing Devices" describes example devices that can utilize the principles described herein in accordance with one or more embodiments.

Operating Environment

Figure 1:
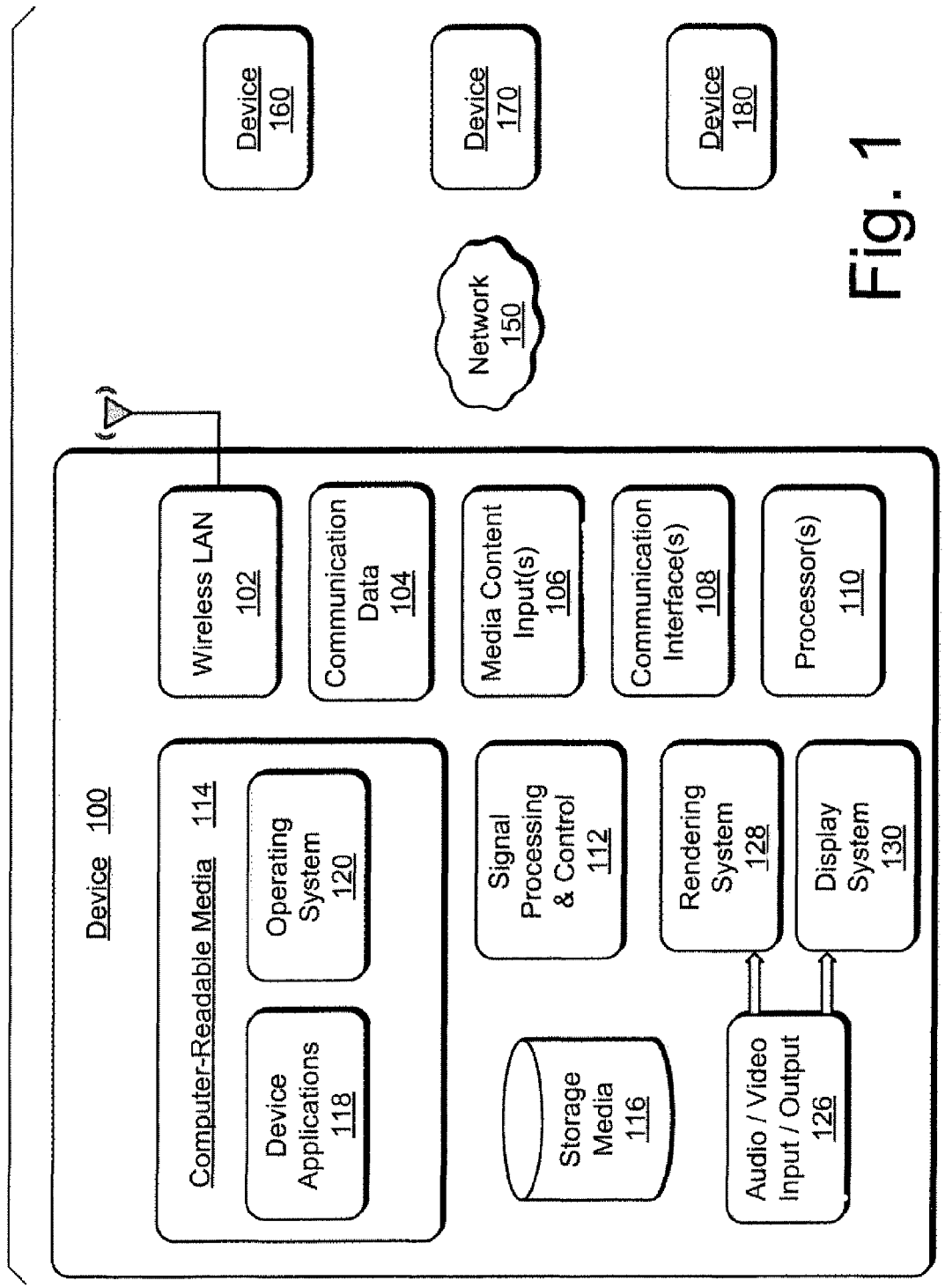
FIG. 1 illustrates an operating environment in accordance with one or more embodiments.

FIG. 1 illustrates an operating environment that includes an example device 100, a network 150, and various devices 160, 170, and 180 with which device 100 can communicate. The illustrated devices can be implemented as any form of a communication-enabled device to implement various embodiments described in this document. In various embodiments, device 100, as well as devices 160, 170 and 180 can be implemented as any one or combination of Ethernet-capable devices including, by way of example and not limitation, a media device, computer device, telephone (e.g., cellular, VoIP, Wi-Fi, etc.), high definition television (HDTV), television set-top box, appliance device, gaming device, electronic device, vehicle, workstation, access point, and/or as any other type of device implemented for data communication, additional examples of which are provided in FIGS. 5-12 below.

Device 100 includes wired and/or wireless LAN (WLAN) components 102, that enable communication of communication data 104 (e.g., received communication data, communication data that is being received, communication data scheduled for transmission, data packets of the communication data, etc.). Device 100 can also include one or more media content input(s) 106 via which any type of media content can be received, such as music, television media content, and any other type of audio, video, and/or image media content received from a media content source which can be rendered and/or displayed for viewing.

Device 100 can also include communication interface(s) 108 that can be implemented as any one or more of a serial and/or parallel interface, a wireless interface, any type of network interface, a modem, and any other type of communication interface. A wireless interface enables device 100 to receive control input commands and other data from an input device, such as from a remote control device, a portable computing-based device (such as a cellular phone), or from another infrared (IR) or similar RF input device.

Device 100 can also include one or more processor(s) 110 (e.g., any of microprocessors, controllers, and the like) which process various computer-executable instructions to control the operation of device 100, to communicate with other electronic and computing devices, and to implement embodiments described herein. Alternatively or in addition, device 100 can be implemented with any one or combination of hardware, firmware, or fixed logic circuitry that is implemented in connection with signal processing and control circuits which are generally identified at 112.

Device 100 can include computer-readable media 114, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), any type of a digital versatile disc (DVD), and the like. Device 100 may also include a mass storage media device 116.

Computer-readable media 114 provides data storage mechanisms to store the communication data 104, as well as various device applications 118 and any other types of information and/or data related to operational aspects of device 100. For example, an operating system 120 can be maintained as a computer application with the computer-readable media 114 and executed on processor(s) 110. In this example, the device applications 118 are shown as software modules and/or computer applications that can implement various functionality that can be utilized by the embodiments described herein.

Device 100 can also include an audio and/or video input/output system 126 that provides audio data to an audio rendering system 128 and/or provides video data to a display system 130. The audio rendering system 128 and/or the display system 130 can include any devices that process, display, and/or otherwise render audio, video, and image data. Video signals and audio signals can be communicated from device 100 to an audio device and/or to a display device via an RF (radio frequency) link, S-video link, composite video link, component video link, DVI (digital video interface), analog audio connection, or other similar communication link. In an embodiment, audio rendering system 128 and/or the display system 130 can be implemented as external components to device 100. Alternatively, the audio rendering system 128 and/or the display system 130 can be implemented as integrated components of the example device 100.

Although not shown, device 100 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Example Architecture

Figure 2:
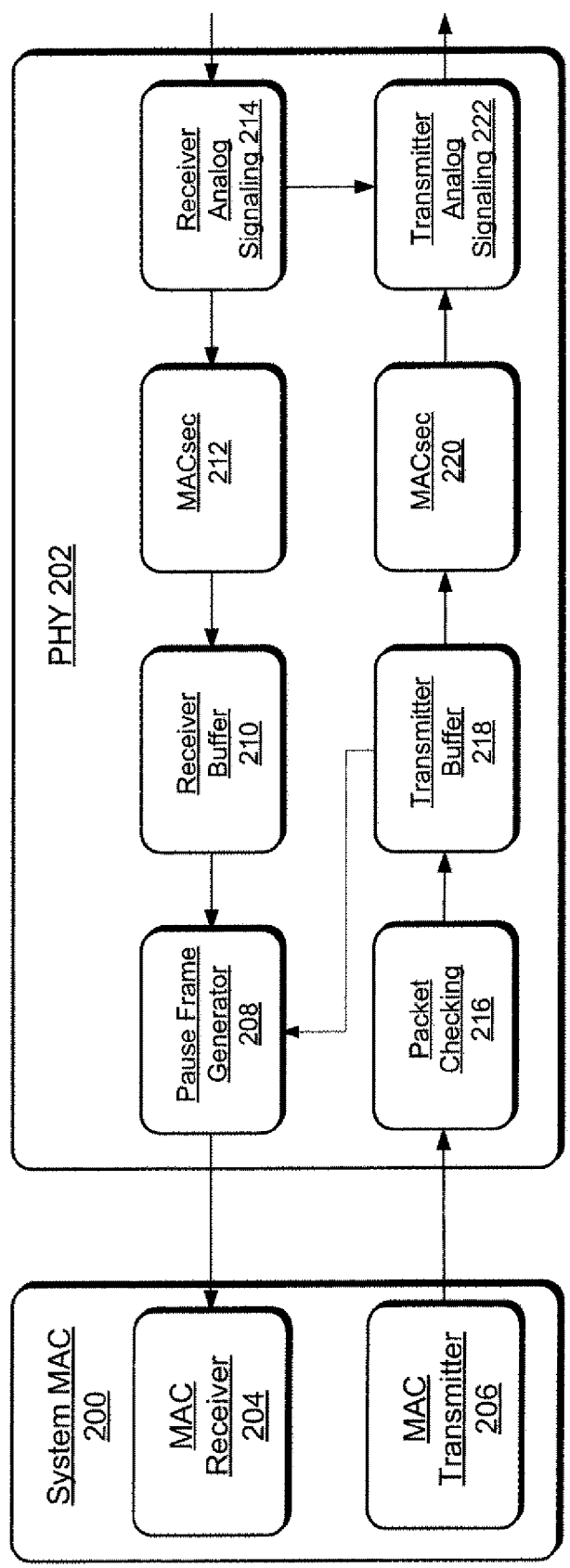
FIG. 2 illustrates an architecture in accordance with one or more embodiments.

FIG. 2 illustrates an example architecture in accordance with one or more embodiments. The architecture can be implemented with devices such as those described above, below, and others. In at least some embodiments, the architecture is implemented as an application specific integrated circuit (ASIC). In this example, the architecture includes a system MAC 200 and a PHY 202. System MAC 200 includes a MAC receiver 204 and a MAC transmitter 206. In this example, communication paths into and out of receiver 204 and transmitter 206 respectively, are unidirectional from and to PHY 202. An ingress path through which encrypted packets are received into the PHY 202 includes, in this example, a pause frame generator 208, a receiver buffer 210, a MACsec component 212, and a receiver analog signaling component 214. An egress path through which unencrypted packets are received into the PHY 202 from System MAC 200 includes, in this example, a packet checking component 216, a transmitter buffer 218, a MACsec component 220 and a transmitter analog signaling component 222.

In operation, MAC transmitter 206 transmits unencrypted packets into the PHY 202. In at least some embodiments, transmitted packets are 64 bytes in size with a spacing defined by the specification, e.g., 20 bytes, although packet sizes can vary. For example, in some embodiments, standard Ethernet packets can range from 64 to 1518 bytes, with some devices frequently accepting packets up to 9000+ bytes. The unencrypted packets are received into packet checking component 216 and then placed into the transmitter buffer 218. Packet checking can include, by way of example and not limitation, checking for incorrect CRCs, incorrect spacing between the packets, and packet lengths under a minimum size or over a maximum size. Encryption processing is performed by MACsec component 220 on the individual packets. When the packets are encrypted, the sizes of the packets are increased. For example, in at least some embodiments, encryption processing can increase the packet size by adding 32 bytes to the original 64 bytes for a total packet size of 96 bytes. The encrypted packets are then provided to the transmitter analog signaling component 222 for transmission over the wire. Conversely, encrypted packets are received by receiver analog signaling component 214 and decrypted by MACsec component 212. In at least some embodiments, encrypted packets are 96 bytes in size and, when decrypted, are 64 bytes in size, although packet sizes can range. The decrypted packets are then provided into the receiver buffer 210 for eventual transmission to MAC receiver 204. The pause frame generator 208 generates pause frames that can cause packet transmission by the System MAC 200 to pause or resume based upon a value associated with a transmitted pause frame as described below.

A pause frame is a special packet format that provides a flow control frame that is specifically defined by the IEEE 802.3 specification, specifically Annexes 31A and 31B. Pause frames are typically used between MACs in a link to perform flow control. These frames are identified by a specific Ethertype and multicast MAC address and contain a parameter or value that indicates that a MAC should stop or pause transmission. Subsequent pause frames can contain a parameter or value that indicates that the MAC can resume transmission. In the present example, a zero-value pause frame, referred to as an XON frame, is utilized to notify the System MAC 200 that packet transmission can resume, whereas a high-value pause frame, referred to as an XOFF frame, is utilized to notify the System MAC 200 that transmission is to be paused. Here, however, pause frames are generated within the PHY 202 and are sent in-band over the ingress path to the System MAC 200.

Having the PHY 202 generate pause frames allows the PHY 202 to indicate to the System MAC 200 that it should pause or resume packet transmission. However, having the PHY 202 generate pause frames presents some challenges flowing from the overall system architecture as defined by the specification. First, as noted above, pause frames are typically used for MAC-to-MAC communication, not PHY-to-MAC communication. This means that unless this operation is accounted for, it might be possible for the System MAC 200 to receive pause frames from two different entities—the PHY 202 and a far-side MAC—which could cause internal confusion. Second, in at least some embodiments, the pause frames can be relatively large, on the order of 64 bytes. Injecting these frames in the ingress path can create buffer overflow problems for the receiver buffer 210. Specifically, the ingress path is now being utilized to transmit more data than it receives on a fixed-bandwidth link.

The architecture described above utilizes the capability of the System MAC 200 to receive these pause frames and to use pause frames to stop transmission of packets into the PHY 202. Additionally, in at least some embodiments, a number of mechanisms are employed inside the PHY 202 to address the above-mentioned challenges and to compensate for packet transmission adjustments that are made. These mechanisms include, by way of example and not limitation, flow control termination and a gap credit counter which are each described below.

Consider now the operation of the above-described architecture in more detail starting from the standpoint of the egress path that includes transmitter buffer 218, MACsec component 220 and transmitter analog signaling component 222. As noted above, System MAC 200 transmits packets, through MAC transmitter 206, into the PHY 202. The packets are eventually buffered in transmitter buffer 218 and then encrypted in MACsec module 220. Because the MACsec module 220 enlarges the packets by virtue of the encryption operation that it performs, the MACsec module 220 begins to exert what can be considered as back pressure on the transmitter buffer 218. That is, as the packets get encrypted by the MACsec module 220, the transmitter buffer 218 begins to fill up. The transmitter buffer 218 fills up because packets from the System MAC 200 are transmitted at a small or minimum spacing, e.g. 20 bytes. The MACsec module 220 adds, by virtue of its encryption operation, 32 bytes to each packet. The MACsec module 220 then sends the encrypted packets out over the transmitter analog signaling component 222. The encrypted packets that get sent out are larger than the unencrypted packets that are received.

During this operation, it is desirable to mitigate buffer overflow conditions at transmitter buffer 218 by having the System MAC 220 slow down or adjust its packet transmissions into the PHY 202. In at least some embodiments, buffer overflow conditions are mitigated by defining buffer thresholds for transmitter buffer 218 and using the thresholds to define when pause frames are sent. As an example, consider FIG. 3 which illustrates the architecture of FIG. 2, along with FIG. 4 which illustrates the functionality described just below.

Here, the transmitter buffer 218 includes two thresholds—a first threshold, designated Threshold for XOFF, and a second threshold, designated Threshold for XON. In one or more embodiments, the first and second thresholds are adjustable and can be adjusted by software executing in the system.

In illustrated and described embodiment, as packets are received into transmitter buffer 218 (step 400 in FIG. 4), and by virtue of the back pressure exerted on the transmitter buffer 218 by the MACsec component 220, the buffer level of the transmitter buffer 218 begins to grow. When the Threshold for XOFF is reached (step 402), the transmitter buffer 218 notifies pause frame generator 208 (step 404) to send out an XOFF pause frame (step 406) to the system MAC 200. Otherwise, the method returns to step 400 (i.e. the No path). Responsive to receiving the XOFF pause frame (step 408), the system MAC 200 turns off an associated transmit port (step 410) associated with MAC transmitter 206 and, accordingly, does not transmit any packets. Now because there is no more packet traffic coming into the PHY 202, the level in the transmitter buffer 218 begins to drop. Once the buffer level in the transmitter buffer 218 reaches the Threshold for XON level (step 412), the transmitter buffer 218 notifies the pause frame generator 208 (step 414) to send an XON pause frame to the system MAC 200 (step 416). Upon receipt of the XON pause frame (step 418), the System MAC 200 turns on the transmission port (step 420) associated with MAC transmitter 206 and begins or resumes packet transmission in the PHY 202 (step 422).

This process continues during packet transmission from the System MAC 200, returning to step 400, to mitigate buffer overflow conditions in transmitter buffer 218.

During operation, as noted above and illustrated in the FIG. 5 flow diagram, pause frames can be received from a far-end MAC. Specifically, the receiver analog signaling component 214 can receive these pause frames from far-end MACs. To address this challenge, flow control termination can be used. Specifically, when the receiver analog signaling module 214 receives an XOFF frame from a far-end MAC (step 500), it notifies the transmitter analog signaling module 222 (step 502). The transmitter analog signaling module 222 then stops packet transmission (step 504) which applies back pressure on the MACsec module 220. The MACsec module 220 stops encryption operations (step 506) which then allows the transmitter buffer 218 to begin to fill again. Once the Threshold for XOFF is reached (step 508), the transmitter buffer 218 notifies the pause frame generator 208 (step 510) and, responsively, the pause frame generator 218 sends an XOFF frame (step 512) to the system MAC 200 which then stops packet transmission into the PHY 202 (step 514) as described above.

At this point, the system becomes static until the receiver analog signaling module 214 receives an XON frame from a far-end MAC (step 516). Once received, the receiver analog signaling module 214 notifies the transmitter analog signaling module 222 to begin packet transmission (step 518). At this point, the MACsec module 220 begins encryption on the packets in the transmitter buffer 218 (step 520). Once the Threshold for XON in the transmitter buffer 218 is reached (step 522), the transmitter buffer 218 notifies the pause frame generator 208 (step 524) which then sends an XON frame to the system MAC 200 (step 526). Otherwise, if the Threshold for XON is not reached at step 522, encryption operations continue at step 528 until the Threshold for XON is reached. Responsive to receiving the XON frame (step 530), the System MAC 200 turns on the port associated with MAC transmitter 206 (step 532) which then begins packet transmission into the PHY 202 (step 534). Thus, in at least some embodiments, the PHY 202 can sink pause frames received from other MACs.

In the described approach, pause frames are injected into the ingress path from the PHY 202 to the System MAC 200 over a limited bandwidth communication link. Injecting these pause frames into the ingress path can create buffer overflow problems for the receiver buffer 210. Specifically, the ingress path is now being utilized to transmit more data than it receives on a fixed-bandwidth link. To address this challenge, a gap credit counter can be used.

In one or more embodiments, the gap credit counter measures the gap between packets that are received, on the receive side 210a, into receiver buffer 210. Any measured gap larger than a standard value results in an accumulation of a credit, thus implying that there is bandwidth available to send a pause frame. On the transmit side 210b of the receiver buffer 210, any measured gap larger than a standard value, or transmission of a pause frame, results in a reduction of a credit because the larger gap consumes bandwidth that could otherwise have been used to send a pause frame. If the available credit is larger than the size of a pause frame, then the PHY 202 knows that a pause frame can be sent without impacting communication traffic. It is also possible, in at least some embodiments, for the gap credit counter to run at a deficit whereby transmitting a pause frame would cause the gap credit counter to become negative. In these instances, where a gap credit counter would become negative, pause frames are not allowed to be transmitted until the gap credit counter crosses a defined positive threshold.

In addition, in at least some embodiments, gap credits can flow from packet gaps that are smaller than the Inter-Packet Gap (IPG) defined by the IEEE 802.3 specification. That is, many MACs can operate with packet gaps that are smaller than the packet gaps specified by the specification. These smaller packet gaps can translate to gap credits that can then be taken into account when pause frames are to be sent.

Further, packets that are utilized in the above-described system are typically prefixed by seven bytes of preamble which, in some instances, can be reduced or eliminated. In these instances, elimination or reduction of packet preambles can result in gap credits that can be taken into account when pause frames are to be sent.

In at least some embodiments, using both packet gaps that are smaller than the IPG defined by the IEEE 802.3 specification and reducing or eliminating packet preambles can cause further reductions in the packet gaps which, in turn, can result in gap credits. For example, a normal gap between packets is on the order of 160 ns. By using both techniques described above, this gap can be reduced to as little as 16 ns. Because wire-side packet spacings should remain unchanged, this effectively results in a credit of up to 144 ns per packet. With full savings realized, the PHY 202 can insert a pause frame for every four packets received on the wire, without adversely impacting incoming traffic.

Further, some MACs may be able to correctly receive and process packets even when the packets are below the Ethernet minimum packet size of 64 bytes. In these cases, reducing the size of the pause frame will reduce the amount of available credit in order to send a new packet.

Example Method

Figure 6:
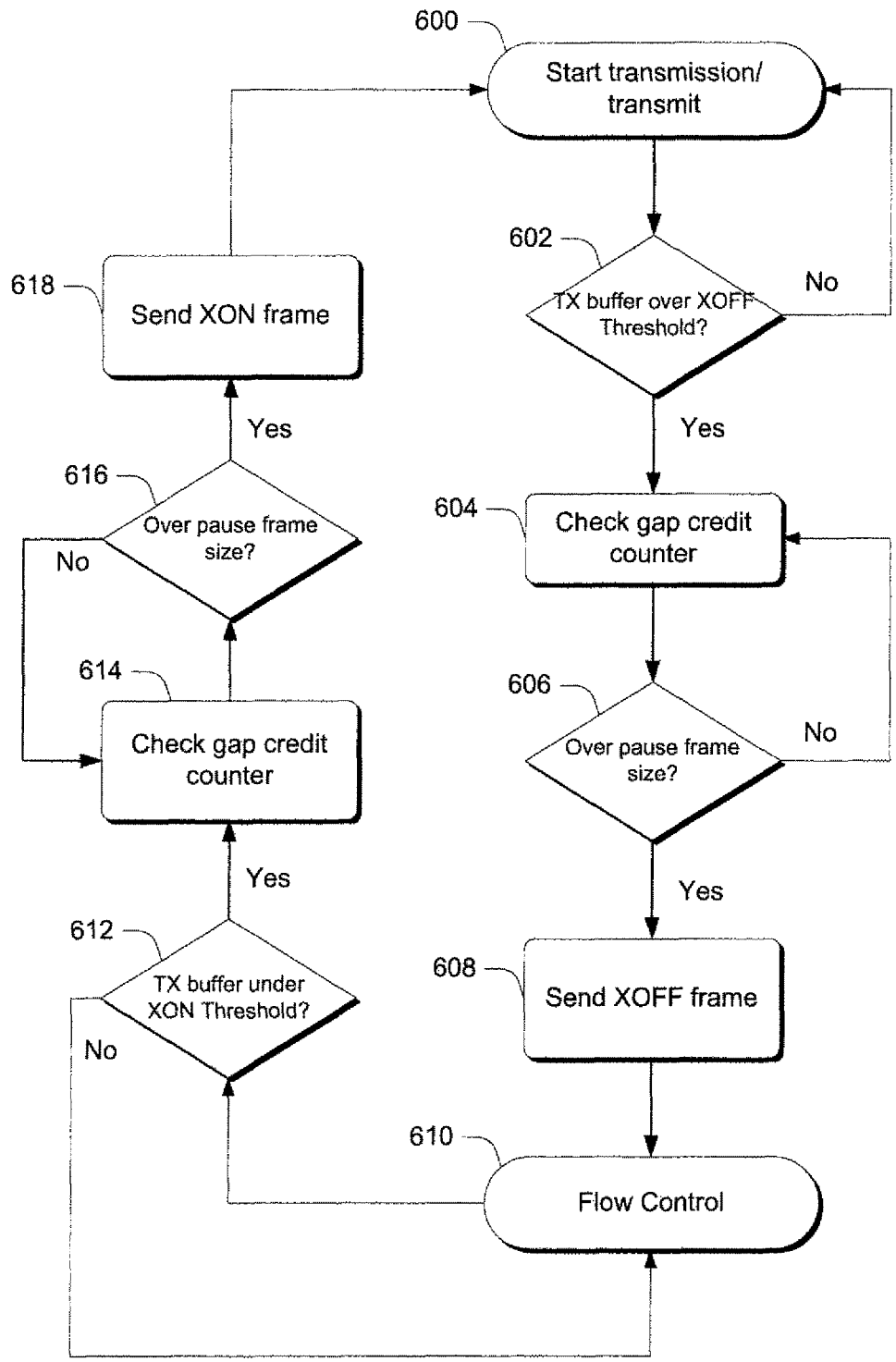
FIG. 6 illustrates a flow diagram that describes steps in a method in accordance with one or more embodiments.

FIG. 6 is a flow diagram that describes steps in a method in accordance with one or more embodiments. The method can be implemented in connection with any suitable hardware, software, firmware, or combination thereof. In at least some embodiments, the method can be implemented in connection with a system such as those systems that are described above and below.

Figure 3:
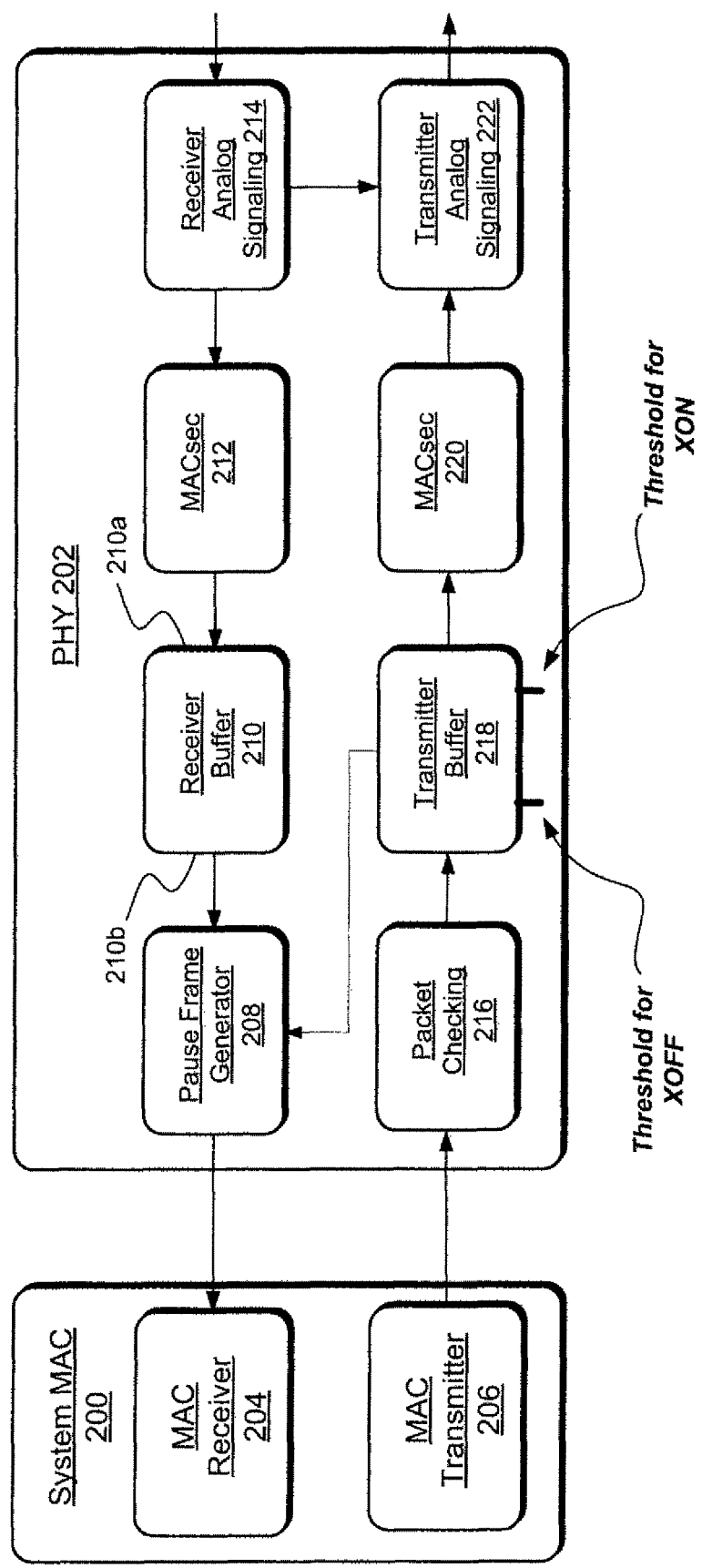
FIG. 3 illustrates the FIG. 2 architecture in accordance with one or more embodiments.
Figure 4:
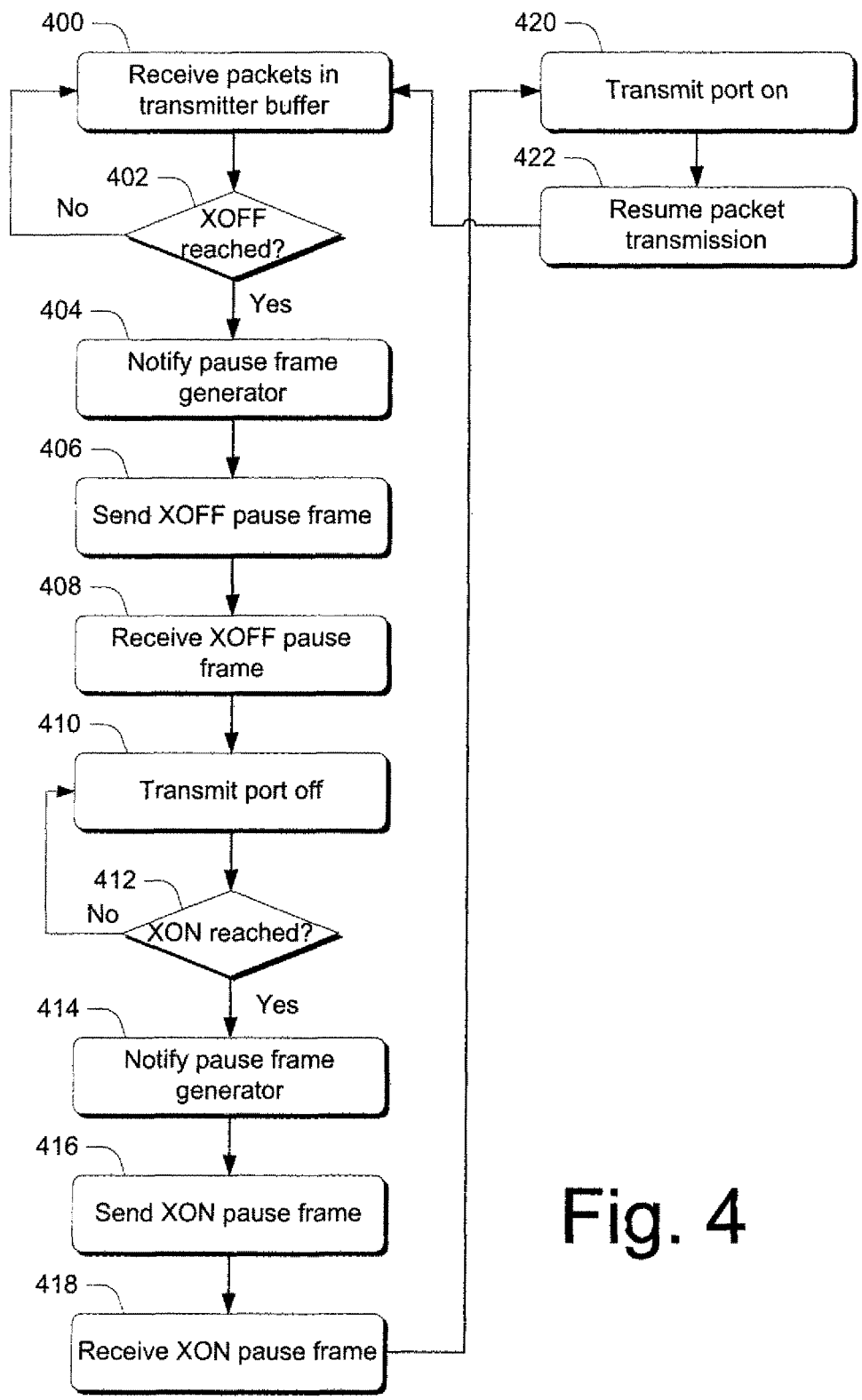
FIG. 4 illustrates a flow diagram that describes steps in a method in accordance with one or more embodiments.
Figure 5:
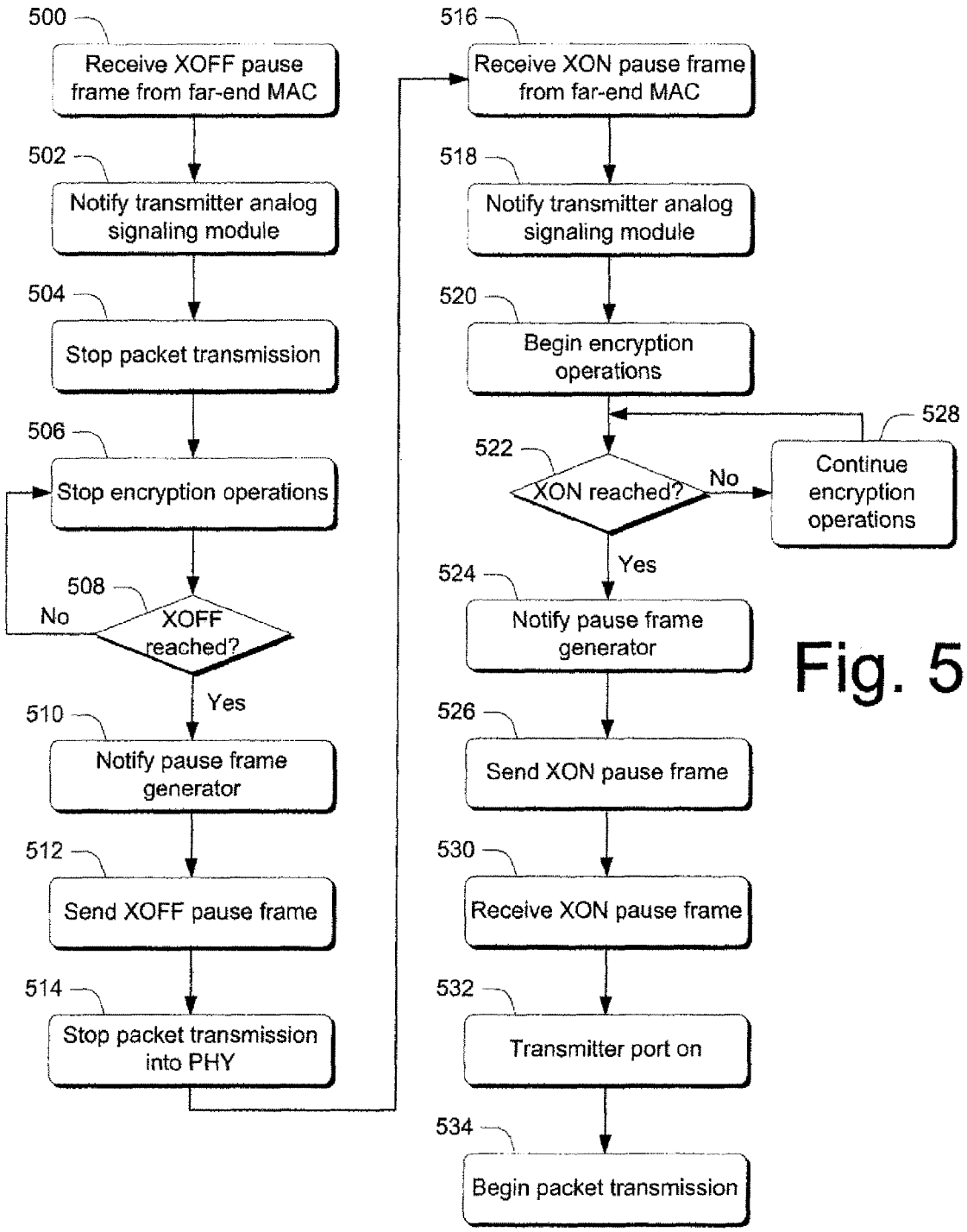
FIG. 5 illustrates a flow diagram that describes steps in a method in accordance with one or more embodiments.

A packet transmission state 600 is entered in which packet transmission is initiated or re-started. In at least some embodiments, this step can be performed by a System MAC such as System MAC 200 (FIGS. 2 and 3). Step 602 ascertains whether a transmitter buffer is over a first threshold, e.g. a XOFF Threshold. In the illustrated and described embodiments, the transmitter buffer is configured to hold transmitted packets that are awaiting encryption. If the transmitter buffer is not over the first threshold, then the method returns to step 600 and continues packet transmission. If, on the other hand, the transmitter buffer is over the first threshold, step 604 checks a gap credit counter. An example of a gap credit counter is provided above. Step 606 ascertains whether the gap credit counter is over a pause frame size. If the gap credit counter is not over the pause frame size, the method returns to step 604. During continuous packet transmission, in at least some embodiments, the gap credit counter will continue to grow. Accordingly, by returning to step 604, the gap credit counter can be checked multiple times until the gap credit counter is over the pause frame size.

If the gap credit counter is found, at step 606, to be over the pause frame size, then step 608 sends a pause frame in the form of an XOFF frame. This step can be performed in any suitable way. For example, in at least some embodiments, this step can be performed by having the transmitter buffer notify a pause frame generator to generate a pause frame and send the pause frame to the System MAC. At this point, the System MAC stops transmitting packets and the system enters a flow control state 610.

During the flow control state 610, step 612 ascertains whether the transmitter buffer is under a second threshold, e.g. a XON Threshold. If, during the flow control state 610, the transmitter buffer is not under the second threshold, the method returns to the flow control state 610 which, in essence, maintains the flow control state 610. During the flow control state, packets can be encrypted and sent out over the wire. If, on the other hand, the transmitter buffer is under the second threshold, step 614 checks the gap credit counter. Step 616 ascertains whether the gap credit counter is over a pause frame size. If the gap credit counter is not over the pause frame size, the method returns to step 614. If, on the other hand, step 616 ascertains that the gap credit counter is over the pause frame size, step 618 sends a pause frame in the form of an XON frame. This step can be performed in any suitable way. For example, in at least some embodiments, this step can be performed by having the transmitter buffer notify the pause frame generator to generate a pause frame which is sent to the System MAC. Responsive to receiving the XON frame, packet transmission can resume by returning to the packet transmission state 600.

In at least some embodiments, many of the steps in the above-described method can be performed by the PHY. For example, buffer checking performed by steps 602 and 612 can be performed inside the PHY. Further, the gap credit counter checks performed by steps 604, 606, 614 and 616 can also be performed inside the PHY. Further, the pause frames sent by steps 608 and 618 can also be performed inside the PHY.

Example Computing Devices

Referring now to FIGS. 7-10, various example computing devices are illustrated that can utilize the embodiments described above. The above-described embodiments can be utilized in a variety of devices including, by way of example and not limitation, devices that are utilized in enterprise networks. Such devices can include IP phones, IP security cameras, bridges, switches, routers, network-attached storage (NAS) and the like. A description of non-limiting examples of such devices appears just below.

Figure 7:
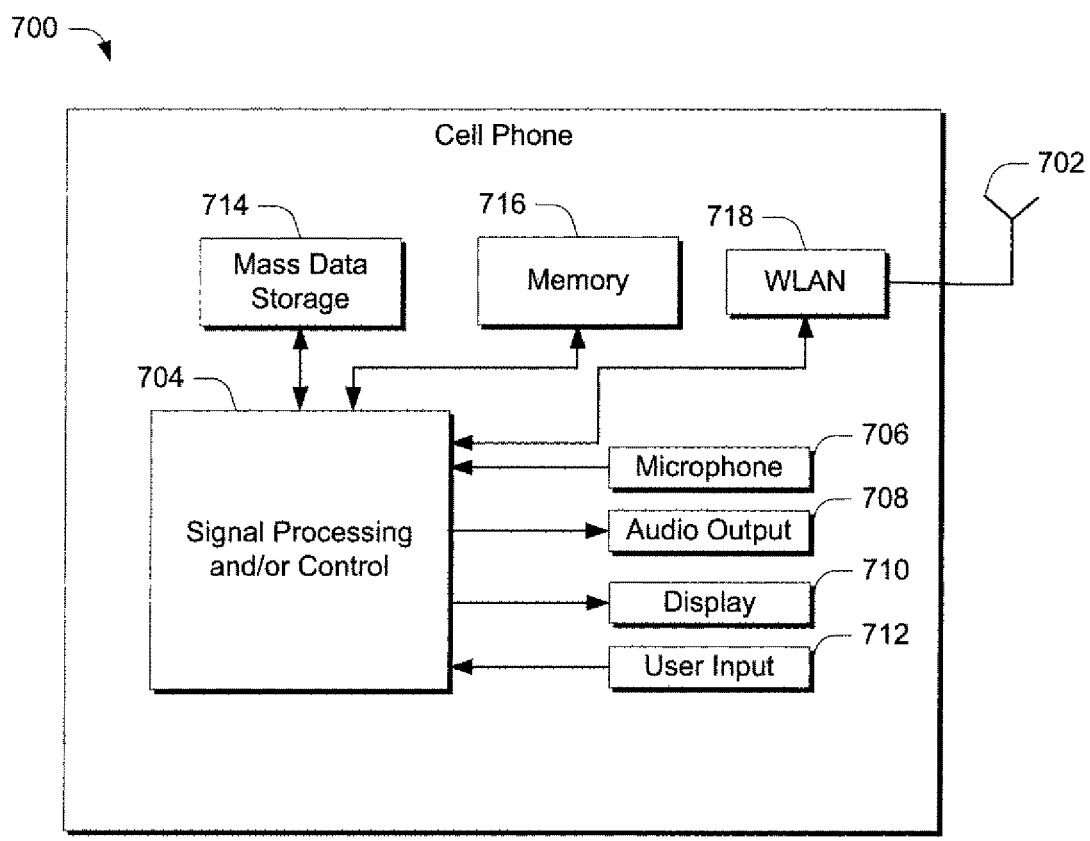
FIGS. 7-10 illustrate various implementations of example embodiments.

Referring now to FIG. 7, the embodiments described above may be embodied in a cellular phone 700 that may include a cellular antenna 702. The embodiments may be implemented in connection with either or both signal processing and/or control circuits, which are generally identified at 704, a WLAN interface and/or mass data storage of the cellular phone 700. In some implementations, cellular phone 700 includes a microphone 706, an audio output 708 such as a speaker and/or audio output jack, a display 710, and/or an input device 712 such as a keypad, pointer, voice actuation device, and/or other input device. Signal processing and/or control circuits 704 and/or other circuits (not shown) in cellular phone 700 may process data, perform coding, decoding and/or encryption, perform calculations, format data, and/or perform other cellular-phone functions.

Cellular phone 700 may communicate with mass data storage 714 that stores data in a nonvolatile manner such as optical and/or magnetic storage devices for example hard disk drives (HDD) and/or DVDs. The HDD may be a mini HDD that includes one or more platters having a diameter that is smaller than approximately 1.8". Cellular phone 700 may be connected to memory 716 such as RAM, ROM, low latency nonvolatile memory such as flash memory and/or other suitable electronic data storage. Cellular phone 700 also may support connections with a WLAN via a WLAN network interface 718.

Figure 8:
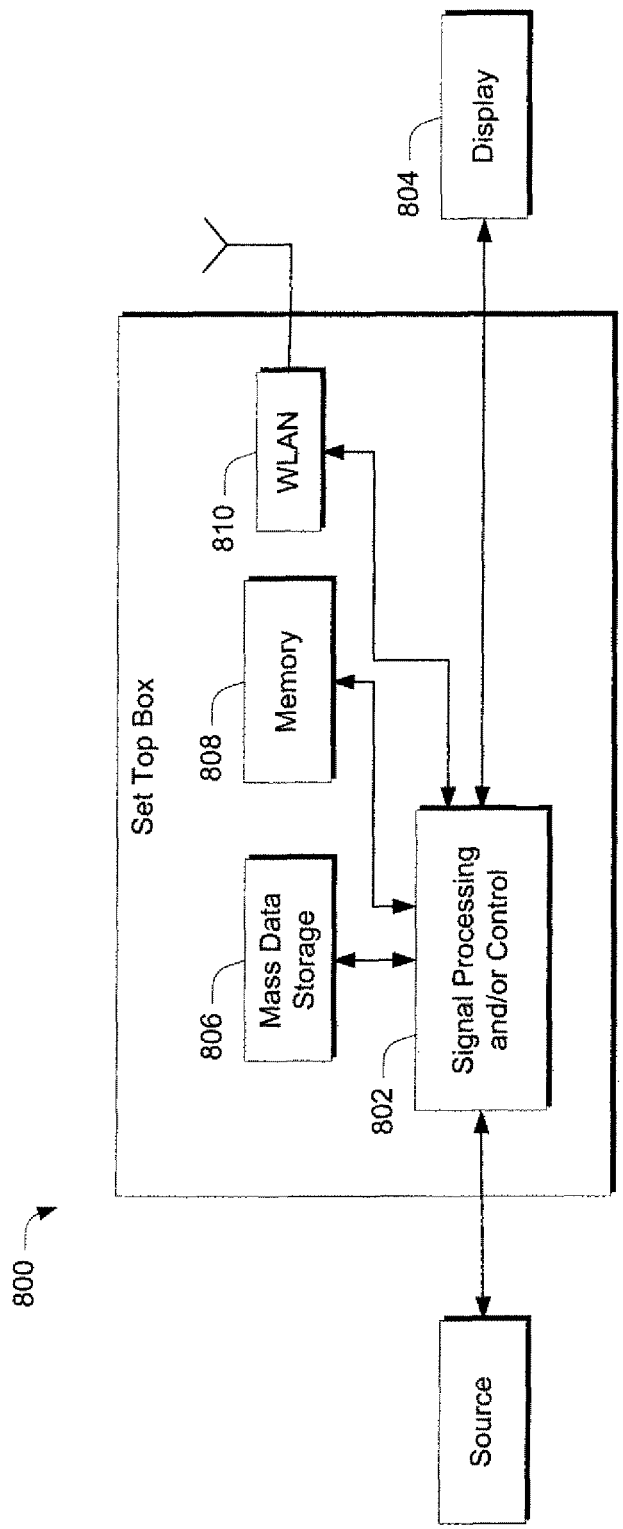

Referring now to FIG. 8, the embodiments described above may be embodied in a set top box 800, which may be implemented by either or both signal processing and control circuits, which are generally identified at 802, a WLAN interface, and/or mass data storage of the set top box 800. Set top box 800 receives signals from a source such as a broadband source and outputs standard and/or high definition audio/video signals suitable for a display 804, such as a television and/or monitor and/or other video and/or audio output devices. Signal processing and/or control circuits 802 and/or other circuits (not shown) of the set top box 800 may process data, perform coding, decoding and/or encryption, perform calculations, format data, and/or perform any other set-top-box function.

Set top box 800 may communicate with mass data storage 806 that stores data in a nonvolatile manner. Mass data storage 806 may include optical and/or magnetic storage devices for example hard disk drives (HDD) and/or DVDs. The HDD may be a mini HDD that includes one or more platters having a diameter that is smaller than approximately 1.8". Set top box 800 may be connected to memory 808 such as RAM, ROM, low latency nonvolatile memory such as flash memory, and/or other suitable electronic data storage. Set top box 800 also may support connections with a WLAN via a WLAN network interface 810.

Figure 9:
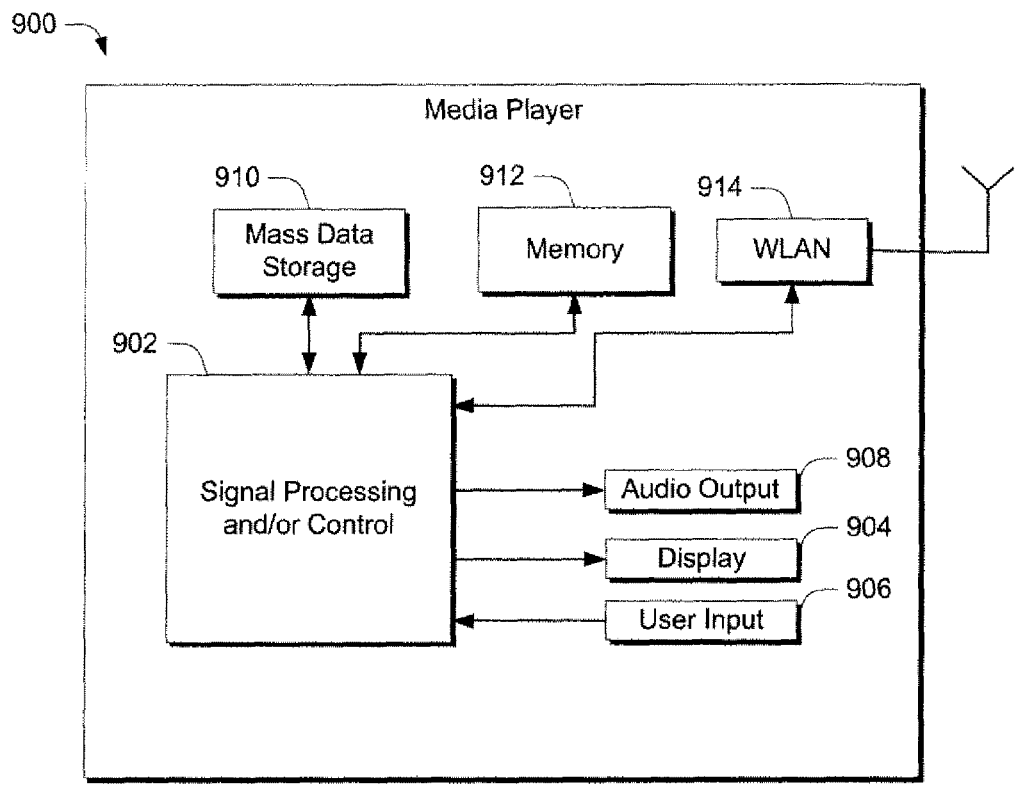

Referring now to FIG. 9, the embodiments described above may be embodied in a media player 900 and may be implemented in connection with either or both signal processing and/or control circuits, which are generally identified at 902, a WLAN interface and/or mass data storage of the media player 900. In some implementations, media player 900 includes a display 904 and/or a user input 906 such as a keypad, touchpad, and the like. In some implementations, media player 900 may employ a graphical user interface (GUI) that typically employs menus, drop down menus, icons, and/or a point-and-click interface via display 904, and/or user input 906. Media player 900 further includes an audio output 908 such as a speaker and/or audio output jack. Signal processing and/or control circuits 902 and/or other circuits (not shown) of media player 900 may process data, perform coding, decoding and/or encryption, perform calculations, format data, and/or perform any other media player function.

Media player 900 may communicate with mass data storage 910 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives (HDD) and/or DVDs. The HDD may be a mini HDD that includes one or more platters having a diameter that is smaller than approximately 1.8". Media player 900 may be connected to memory 912 such as RAM, ROM, low latency nonvolatile memory such as flash memory, and/or other suitable electronic data storage. Media player 900 also may support connections with a WLAN via a WLAN network interface 914.

Figure 10:
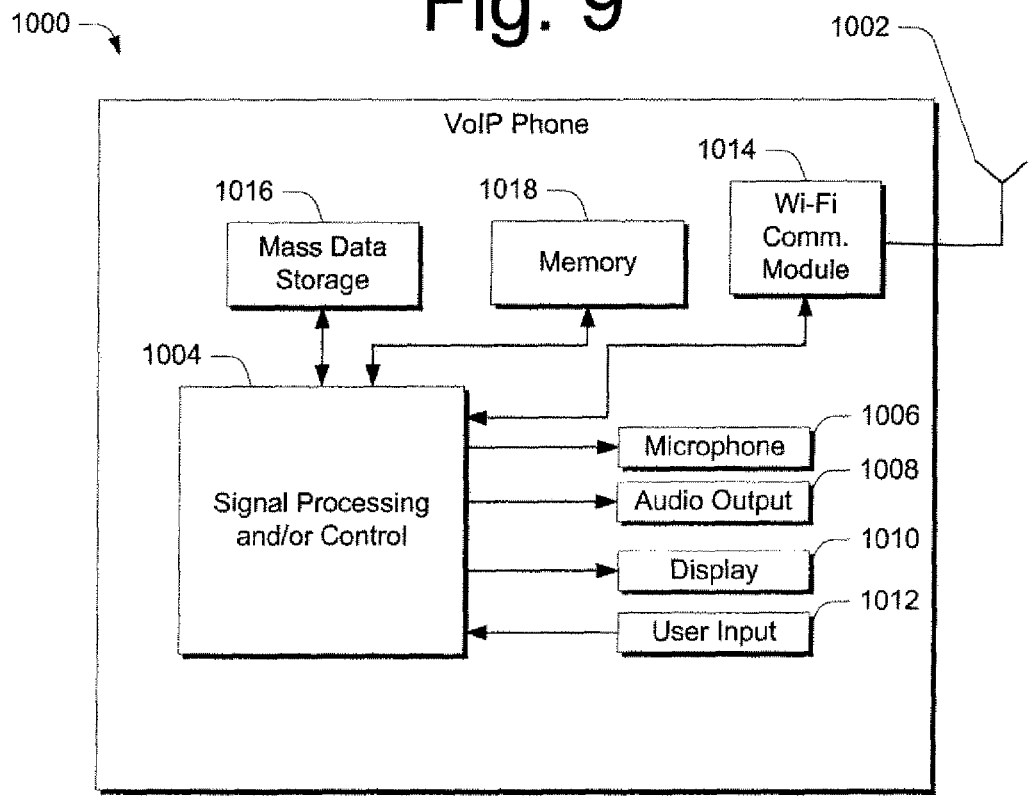

Referring to FIG. 10, the embodiments described above may be embodied in connection with a Voice over Internet Protocol (VoIP) phone 1000 that may include an antenna 1002. The embodiments described above may be implemented in connection with either or both signal processing and/or control circuits, which are generally identified at 1004, a wireless interface, and/or mass data storage of the VoIP phone 1000. In some implementations, VoIP phone 1000 includes, in part, a microphone 1006, an audio output 1008 such as a speaker and/or audio output jack, a display monitor 1010, an input device 1012 such as a keypad, pointing device, voice actuation, and/or other input devices, and a Wireless Fidelity (Wi-Fi) communication module 1014. Signal processing and/or control circuits 1004 and/or other circuits (not shown) in VoIP phone 1000 may process data, perform coding, decoding and/or encryption, perform calculations, format data, and/or perform other VoIP phone functions.

VoIP phone 1000 may communicate with mass data storage 1016 that stores data in a nonvolatile manner such as optical and/or magnetic storage devices, for example hard disk drives (HDD) and/or DVDs. The HDD may be a mini HDD that includes one or more platters having a diameter that is smaller than approximately 1.8". VoIP phone 1000 may be connected to memory 1018, which may be a RAM, ROM, low latency nonvolatile memory such as flash memory, and/or other suitable electronic data storage. VoIP phone 1000 is configured to establish communications link with a VoIP network (not shown) via Wi-Fi communication module 1014. Still other implementations in addition to those described above are contemplated.

CONCLUSION

Various embodiments provide a way to adjust transmission rates of a medium access controller (MAC) to a physical layer (PHY) to accommodate for packet expansions due to encryption that takes place in the PHY. In at least some embodiments, a communication interface between different MACs in a system is re-purposed to allow the PHY to communicate to a system MAC to notify the system MAC to pause and then resume, at an appropriate time, its packet transmissions. This solution utilizes in-band notifications so, from a MAC's perspective, it appears as if notifications to pause transmissions come from another MAC at a far end of the link.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A device comprising:
a physical layer (PHY) defining a communication path for packets into and out of a system medium access controller (MAC), the PHY having an inter-packet gap credit counter,
wherein the PHY is configured to
ascertain that an accumulation of inter-packet gaps measured by the inter-packet gap credit counter is at or over a pause frame size, and
source an XOFF pause frame or an XON pause frame to be sent to the system MAC over the communication path to pause or resume packet transmission.

2. The device of claim 1, wherein the communication path comprises an in-band communication path between the PHY and the system MAC.

3. The device of claim 1, wherein the PHY is configured to use one or more buffer thresholds to define when to source the XOFF pause frame or the XON pause frame.

4. The device of claim 3, wherein a first buffer threshold defines when the XOFF pause frame is sourced to stop the packet transmission and a second buffer threshold defines when the XON pause frame is sourced to resume the packet transmission.

5. The device of claim 1, wherein the PHY is configured to sink other pause frames received from other MACs.

6. The device of claim 5, wherein the PHY is configured to the sink other pause frames by receiving said other pause frames and, responsively, notifying a transmitter analog signaling module to stop the packet transmission.

7. The device of claim 6, wherein the PHY is configured to stop encryption operations on packets responsive to the transmitter analog signaling module stopping the packet transmission.

8. The device of claim 6, wherein the PHY is configured to notify the transmitter analog signaling module to begin the packet transmission upon receiving a different pause frame from at least one of said other MACs.

9. The device of claim 8, wherein the PHY is configured to begin encryption operations on packets responsive to the transmitter analog signaling module beginning the packet transmission.

10. The device of claim 9, wherein the PHY is configured to source an XON pause frame when a transmitter buffer threshold is reached effective to begin the packet transmission into the PHY.

11. The device of claim 1, wherein the device is compliant with IEEE 802.1AE specification.

12. A method comprising:
transmitting one or more packets from a system medium access controller (MAC) to a physical layer (PHY);
buffering the transmitted packets in a transmitter buffer in the PHY;
ascertaining whether the transmitter buffer in the PHY is over a first threshold;
ascertaining whether an accumulation of inter-packet gaps measured by an inter-packet gap credit counter is over a pause frame size; and
responsive to i) the transmitter buffer being over the first threshold and ii) the accumulation being over the pause frame size,
sourcing an XOFF pause frame to be sent to the MAC to pause packet transmission,
ascertaining whether the transmitter buffer in the PHY is under a second threshold, and responsive to the transmitter buffer being under the second threshold,
sourcing an XON pause frame to be sent to the MAC to resume the packet transmission.

13. The method of claim 12, further comprising sinking, in the PHY, other pause frames received from other MACs.

14. The method of claim 13, further comprising notifying, responsive to sinking the other pause frames from the other MACs, a transmitter analog signaling module associated with the PHY to stop the packet transmission.

15. A device comprising:
a physical layer (PHY) defining a communication path for packets into and out of a system medium access controller (MAC), the PHY configured to:
decrease a transmission time of packets transmitted to the MAC by reducing an inter-packet gap of the packets by a particular amount of time, the decreased transmission time of the packets resulting in an inter-packet gap credit of the particular amount of time; and
transmit a pause frame to the MAC to cause the MAC to pause or resume packet transmission, the pause frame transmitted using at least a portion of the inter-packet gap credit.

16. The device of claim 15, wherein a combined transmission time of the packets having reduced inter-packet gaps and the pause frame is less than the transmission time of the packets.

17. The device of claim 15, wherein a size of the reduced inter-packet gap is less than an IEEE 802.3 specified inter-packet gap size.

18. The device of claim 15, wherein the PHY is further configured to reduce or eliminate preambles of the packets sent to the MAC, the reduced or eliminated preambles resulting in additional inter-packet gap credit.

19. The device of claim 15, further comprising an inter-packet gap credit counter, and wherein the PHY is configured to ascertain that an accumulation of inter-packet gaps measured by the inter-packet gap credit counter is over a pause frame size.

20. The device of claim 15, wherein a size of the pause frame sent to the MAC is less than an IEEE 802.3 specified pause frame size.

* * * * *